US012046411B2

(12) United States Patent
Lee et al.

(10) Patent No.: US 12,046,411 B2
(45) Date of Patent: Jul. 23, 2024

(54) COIL COMPONENT

(71) Applicant: SAMSUNG ELECTRO-MECHANICS CO., LTD., Suwon-si (KR)

(72) Inventors: Jae Wook Lee, Suwon-si (KR); Sung Sik Shin, Suwon-si (KR); Sung Young Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 563 days.

(21) Appl. No.: 17/108,447

(22) Filed: Dec. 1, 2020

(65) Prior Publication Data

US 2022/0013281 A1 Jan. 13, 2022

(30) Foreign Application Priority Data

Jul. 13, 2020 (KR) ........................ 10-2020-0085920

(51) Int. Cl.
*H01F 27/29* (2006.01)
*H01F 17/00* (2006.01)
(Continued)

(52) U.S. Cl.
CPC ....... *H01F 27/292* (2013.01); *H01F 17/0013* (2013.01); *H01F 17/04* (2013.01); *H01F 27/324* (2013.01); *H01F 2017/048* (2013.01)

(58) Field of Classification Search
CPC .... H01F 27/292; H01F 17/0013; H01F 17/04; H01F 27/324; H01F 2017/048
See application file for complete search history.

(56) References Cited

U.S. PATENT DOCUMENTS

2012/0274432 A1* 11/2012 Jeong .................. H01F 27/2804 336/192
2015/0048915 A1* 2/2015 Yoon ................... H01F 17/0013 336/192

(Continued)

FOREIGN PATENT DOCUMENTS

JP 2019-197781 A 11/2019
KR 10-2015-0089279 A 8/2015

(Continued)

*Primary Examiner* — Malcolm Barnes

(74) *Attorney, Agent, or Firm* — Morgan, Lewis & Bockius LLP

(57) ABSTRACT

A coil component includes a body having one surface and the other surface, opposing each other in one direction, and one end surface connecting the one surface and the other surface, a winding coil disposed in the body and having a lead-out portion exposed to the one end surface of the body, a first insulating layer disposed on the one end surface of the body and having one region and the other region spaced apart from each other in the other direction, perpendicular to the one direction, an external electrode having a connection portion, disposed between the one region and the other region of the first insulating layer to be connected to the lead-out portion, and an extension portion extending from the connection portion to the one surface of the body, and a second insulating layer covering the first insulating layer and the connection portion on the one end surface of the body.

15 Claims, 4 Drawing Sheets

(51) Int. Cl.
*H01F 17/04* (2006.01)
*H01F 27/32* (2006.01)

(56) References Cited

U.S. PATENT DOCUMENTS

| | | | | |
|---|---|---|---|---|
| 2015/0380151 | A1* | 12/2015 | Choi | H01F 41/041 336/200 |
| 2017/0162319 | A1* | 6/2017 | Otani | H01G 4/252 |
| 2018/0182537 | A1* | 6/2018 | Shimizu | H01F 27/29 |
| 2019/0180909 | A1* | 6/2019 | Shinohara | H01F 27/292 |
| 2019/0189338 | A1* | 6/2019 | Kim | H01F 17/04 |
| 2019/0311829 | A1 | 10/2019 | Kang et al. | |
| 2019/0348215 | A1 | 11/2019 | Koike | |
| 2021/0012947 | A1* | 1/2021 | Ishima | H01F 27/2804 |
| 2021/0043367 | A1* | 2/2021 | Yoshioka | H01F 27/2828 |
| 2021/0151248 | A1* | 5/2021 | Ohkubo | H01F 27/29 |

FOREIGN PATENT DOCUMENTS

| | | | | |
|---|---|---|---|---|
| KR | 20150089279 | A * | 8/2015 | H01F 27/292 |
| KR | 20170086356 | A * | 7/2017 | H01F 17/00 |
| KR | 10-2016499 | B1 | 9/2019 | |

* cited by examiner

COIL COMPONENT

CROSS-REFERENCE TO RELATED APPLICATION(S)

The present application claims the benefit of priority to Korean Patent Application No. 10-2020-0085920, filed on Jul. 13, 2020 in the Korean Intellectual Property Office, the entire disclosure of which is incorporated herein by reference.

TECHNICAL FIELD

The present disclosure relates to a coil component.

BACKGROUND

An inductor, a coil component, is a typical passive electronic component used in electronic devices, along with a resistor and a capacitor.

As electronic devices gradually gain higher performance and become smaller, the number of electronic components used in the electronic device is increased while being miniaturized.

When an external electrode is formed using plating process to miniaturize a coil component, the external electrode may be formed to extend to a position, other than a target formation position, due to bleeding of the plating material.

SUMMARY

An aspect of the present disclosure is to provide a coil component, capable of reducing a plating bleeding defect of an external electrode while maintaining connectivity between a winding coil and the external electrode.

According to an aspect of the present disclosure, a coil component includes a body having one surface and an other surface, opposing each other in one direction, and one end surface connecting the one surface and the other surface, a winding coil disposed in the body and having a lead-out portion exposed to the one end surface of the body, a first insulating layer disposed on the one end surface of the body and having one region and an other region spaced apart from each other in an other direction, perpendicular to the one direction, an external electrode having a connection portion, disposed between the one region and the other region of the first insulating layer to be connected to the lead-out portion, and an extension portion extending from the connection portion to the one surface of the body, and a second insulating layer covering the first insulating layer and the connection portion on the one end surface of the body.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
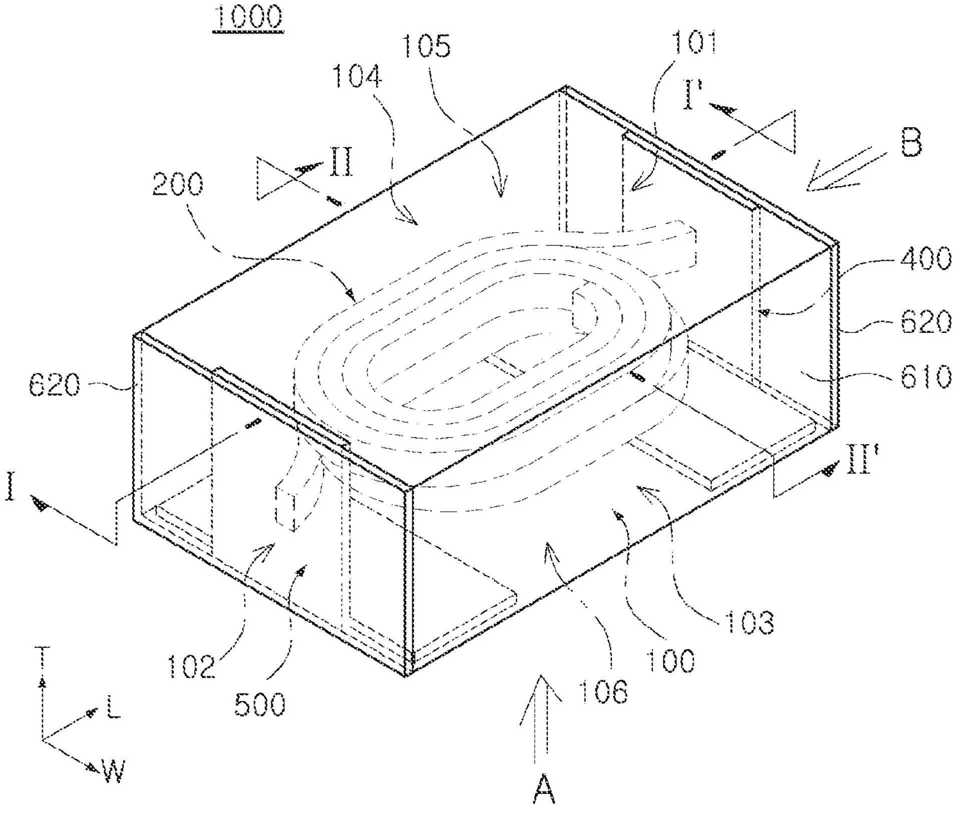
FIG. 1 is a schematic view of a coil component according to an exemplary embodiment of the present disclosure.

The terms used in the description of the present disclosure are used to describe a specific embodiment, and are not intended to limit the present disclosure. A singular term includes a plural form unless otherwise indicated. The terms “include,” “comprise,” “is configured to,” etc. of the description of the present disclosure are used to indicate the presence of features, numbers, steps, operations, elements, parts, or combination thereof, and do not exclude the possibilities of combination or addition of one or more additional features, numbers, steps, operations, elements, parts, or combination thereof. Also, the terms “disposed on,” “positioned on,” and the like, may indicate that an element is positioned on or beneath an object, and does not necessarily mean that the element is positioned above the object with reference to a gravity direction.

The term “coupled to,” “combined to,” and the like, may not only indicate that elements are directly and physically in contact with each other, but also include the configuration in which another element is interposed between the elements such that the elements are also in contact with the other component.

Sizes and thicknesses of elements illustrated in the drawings are indicated as examples for ease of description, and the present disclosure are not limited thereto.

In the drawings, an L direction is a first direction or a length (longitudinal) direction, a W direction is a second direction or a width direction, a T direction is a third direction or a thickness direction.

Hereinafter, a coil component according to an exemplary embodiment of the present disclosure will be described in detail with reference to the accompanying drawings. Referring to the accompanying drawings, the same or corresponding components may be denoted by the same reference numerals, and overlapped descriptions will be omitted.

In electronic devices, various types of electronic components may be used, and various types of coil components may be used between the electronic components to remove noise, or for other purposes.

In other words, in electronic devices, a coil component may be used as a power inductor, a high frequency (HF) inductor, a general bead, a high frequency (GHz) bead, a common mode filter, and the like.

Figure 2:
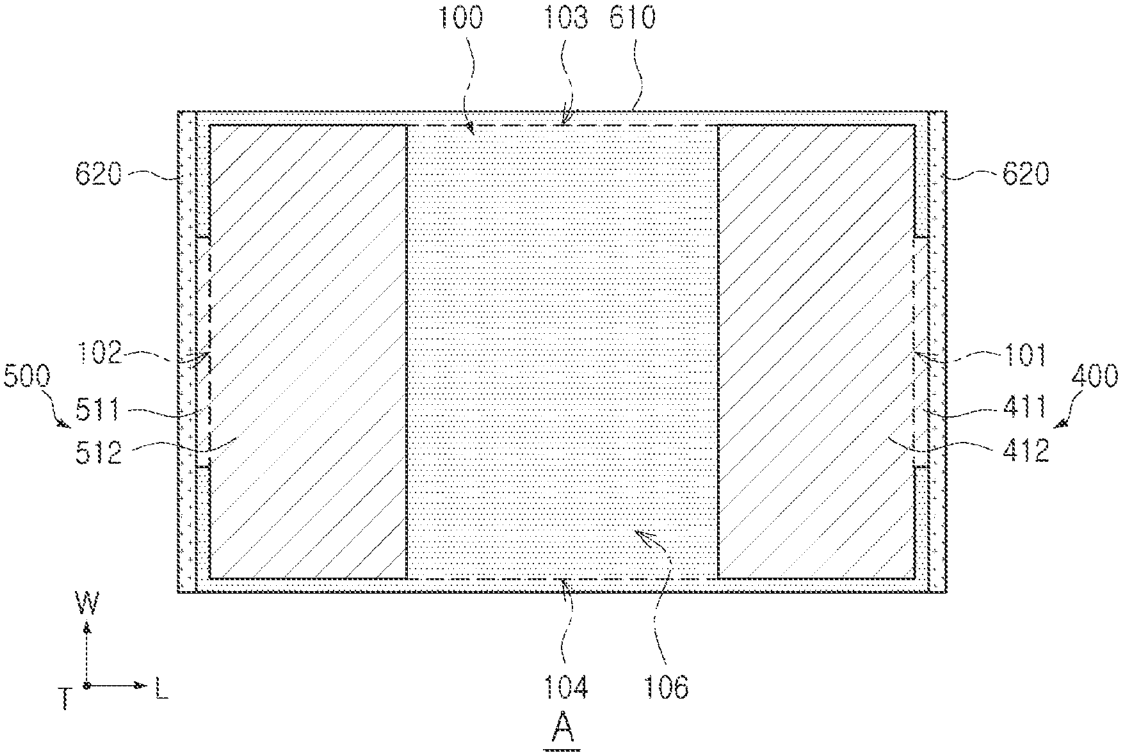
FIG. 2 is a schematic view taken in direction A of FIG. 1.
Figure 3:
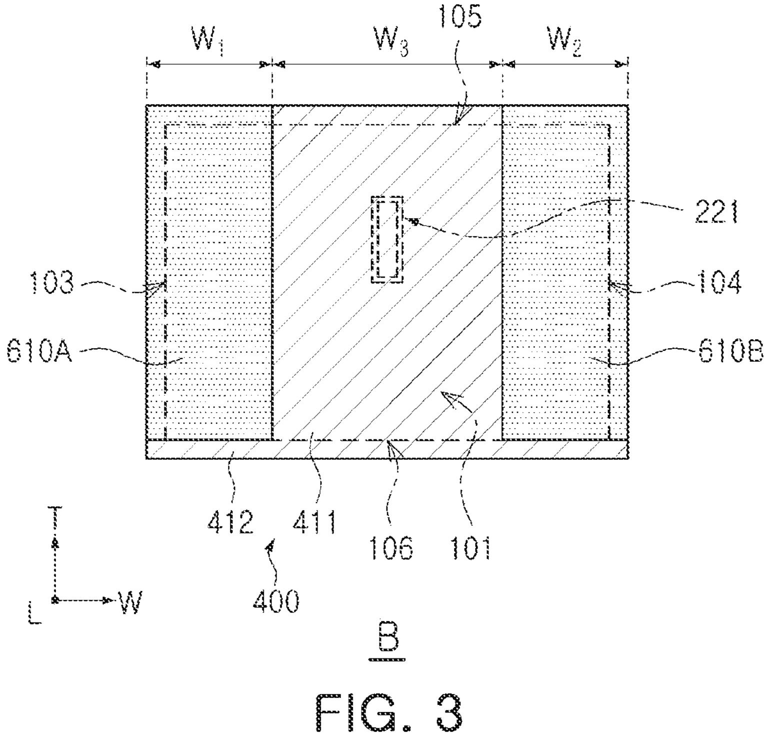
FIG. 3 is a schematic view taken in direction B of FIG. 1.
Figure 4:
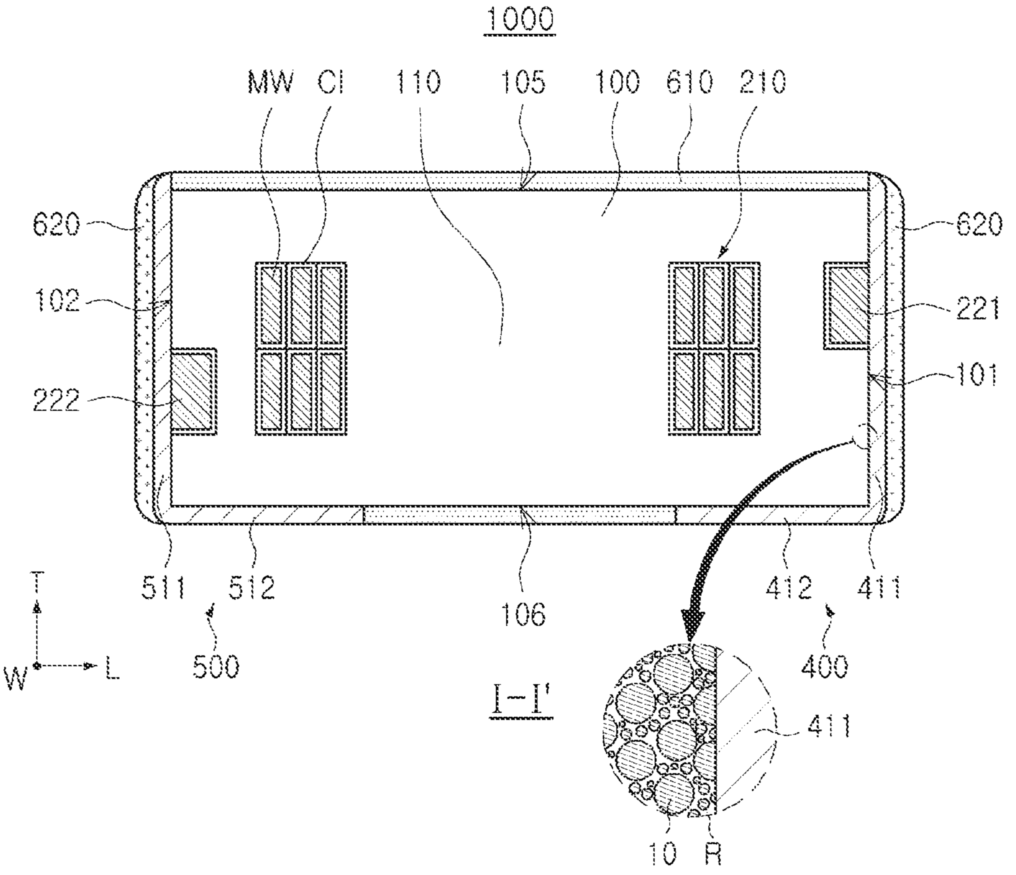
FIG. 4 is a cross-sectional view taken along line I-I' of FIG. 1.
Figure 5:
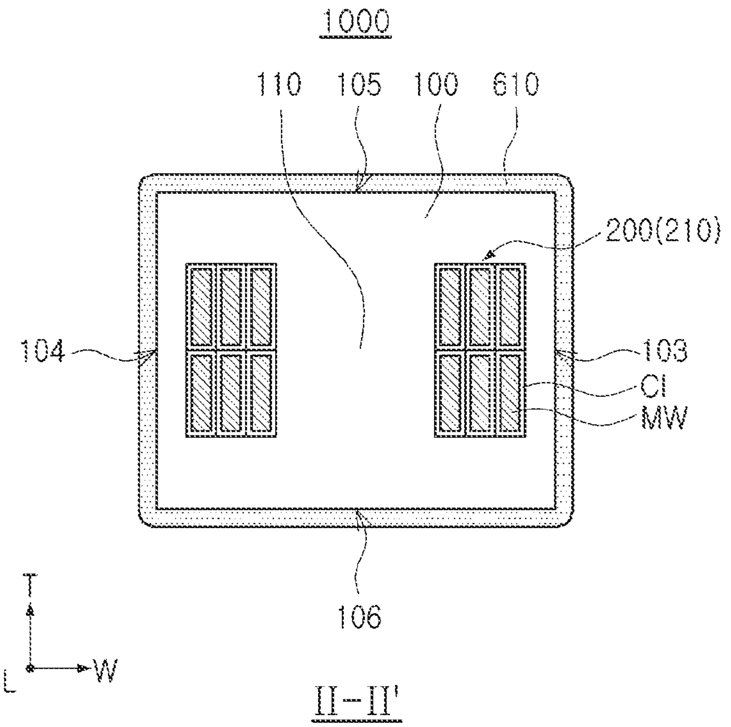
FIG. 5 is a cross-sectional view taken along line II-II' of FIG. 1.

FIG. 1 is a schematic view of a coil component according to an exemplary embodiment of the present disclosure. FIG. 2 is a schematic view taken in direction A of FIG. 1. FIG. 3 is a schematic view taken in direction B of FIG. 1 in which a second insulating layer 62 is omitted for ease of understanding and description of this embodiment. FIG. 4 is a cross-sectional view taken along line I-I' of FIG. 1. FIG. 5 is a cross-sectional view taken along line II-II' of FIG. 1.

Referring to FIGS. 1 to 5, a coil component 1000 according to an exemplary embodiment may include a body 100, a winding coil 200, external electrodes 400 and 500, a first insulating layer 610 and a second insulating layer 620.

The body 100 may form an overall exterior of the coil component 1000, and may embed the winding coil 300 therein.

The body 100 may be formed to have a hexahedral shape overall.

Hereinafter, an exemplary embodiment of the present disclosure will be described on the assumption that the body 100 has a hexahedral shape. However, this description does not exclude coil components, each including a body formed to have another shape, other than the hexahedral shape, within the scope of this embodiment.

The body 100 has a first surface 101 and a second surface 102 opposing each other in a length direction L, a third surface 103 and a fourth surface 104 opposing each other in a width direction W, and a fifth surface 105 and a sixth surface 106 opposing each other in a thickness direction T. Each of the first to fourth surfaces 101, 102, 103, and 104 of the body 100 may correspond to a wall surface of the body 100 connecting the fifth surface 101 and the sixth surface 106 of the body 100. Hereinafter, both end surfaces (one end surface and an other end surface) of the body 100 may refer to the first surface 101 and the second surface 102 of the body 100, respectively, and both side surfaces (one side surface and an other side surface) of the body 100 may refer to the third surface 103 and the fourth surface 104, respectively. One surface of the body 100 may refer to the sixth surface 106 of the body 100, and an other surface of the body 100 may refer to the fifth surface 105 of the body 100. When the coil component 1000 is mounted on a mounting board such as a printed circuit board, or the like, one surface 106 of the body 100 may be disposed to face a mounting surface of the mounting board.

As an example, the body 100 may be formed in such a manner that the coil component 1000, including the external electrodes 400 and 500 and insulating layers 610 and 620 to be described later, has a length of about 2.0 mm, a width of about 1.2 mm, and a thickness of about 0.65 mm, but the present disclosure is not limited thereto. The term "about" as used herein suggests that the particular quantity following the term may vary within measurement and/or manufacturing tolerances. Thus, the above-mentioned length, width, and thickness values of a coil component exclude tolerances, actual length, width, and thickness values of the coil component may be different from the above-mentioned values due to the tolerances.

Each of the length, the width, and the thickness of the coil component 1000 may be measured by a micrometer measurement method. In the micrometer measurement method, measurement may be performed may be measured by setting a zero point using a micrometer (instrument) with gage repeatability and reproducibility (R&R), inserting the coil component 1000 inserted between tips of the micrometer, and turning a measurement lever of the micrometer. When the length of the coil component 1000 is measured by a micrometer measurement method, the length of the coil component 1000 may refer to a value measured once or an arithmetic mean of values measured multiple times. This may be equivalently applied to the width and the thickness of the coil component 1000.

Alternatively, each of the length, the width, and the thickness of the coil component 1000 may be measured by cross-sectional analysis. As an example, the length of the coil component 1000 may refer to a maximum value, among lengths of a plurality of segments, connecting two boundary lines opposing each other in a length (L) direction of the body 100, among outermost boundary lines of the coil component 1000 illustrated in a cross-sectional image, and parallel to the length (L) direction of the body 100, based on an optical microscope or scanning electron microscope (SEM) image for a cross section of the body 100 in a length-thickness (L-T) direction in a central portion of the body 100 in a width (W) direction. Alternatively, the length of the coil component may refer to a minimum value, among lengths of a plurality of segments connecting two boundary lines opposing each other in a length (L) direction, among outermost boundary lines of the coil component 1000 illustrated in the cross-sectional image, and parallel to the length (L) direction of the body 100. Alternatively, the length of the coil component may refer to an arithmetic means of at least three segments, among a plurality of segments connecting two boundary lines opposing each other in a length (L) direction, among outermost boundary lines of the coil component 1000 illustrated in the cross-sectional image, and parallel to the length (L) direction of the body 100. The above description may be equivalently applied to the width and the thickness of the coil component 1000.

The body 100 may include a magnetic material 10 and a resin. However, the body 100 may have a structure other than a structure in which the magnetic material 10 is dispersed in a resin. For example, the body 100 may be formed of a magnetic material such as ferrite or a non-magnetic material.

The magnetic material 10 may be ferrite or magnetic metal powder particles.

Examples of the ferrite powder particles may include at least one or more of spinel type ferrites such as Mg—Zn-based ferrite, Mn—Zn-based ferrite, Mn—Mg-based ferrite, Cu—Zn-based ferrite, Mg—Mn—Sr-based ferrite, Ni—Zn-based ferrite, and the like, hexagonal ferrites such as Ba—Zn-based ferrite, Ba—Mg-based ferrite, Ba—Ni-based ferrite, Ba—Co-based ferrite, Ba—Ni—Co-based ferrite, and the like, garnet type ferrites such as Y-based ferrite, and the like, and Li-based ferrites.

The metal magnetic powder particle may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the metal magnetic powder particle may be at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder.

Hereinafter, a description will be given on the assumption that the magnetic material 10 is magnetic metal powder particles, but the present disclosure is not limited thereto.

The metallic magnetic powder particle may be amorphous or crystalline. For example, the metal magnetic powder particle may be a Fe—Si—B—Cr-based amorphous alloy powder, but is not limited thereto.

Each of the magnetic metal powder particles 10 may have an average diameter in a range from about 0.1 μm to 50 μm, but is not limited thereto.

The magnetic metal powder particle 10 may include an insulating coating layer formed on the surface. Since the magnetic metal powder 10 may itself have conductivity, the insulating coating layer surrounds a surface of the magnetic metal powder 10 to prevent short-circuits between the magnetic metal powder particles 10. The insulating coating layer may include epoxy, polyimide, a liquid crystal polymer, or the like, in a single form or in combined forms, but is not limited thereto. For example, a material and a forming method of the insulating coating layer may change in various ways as long as the insulating coating layer may be formed of an electrically insulating material on the surface of the magnetic metal power particle 10.

The body 100 may include two or more types of magnetic metal powder particle 10. The term "different types of magnetic powder particle" means that the magnetic powder particles, dispersed in the insulating resin, are distinguished from each other by at least one of diameter, composition, crystallinity, and shape. In this specification, the sentence "average diameters of the magnetic metal powder particles 10 are different from each other" may mean that the grain size distribution values, expressed as D50 or D90, are different from each other. The body 100 may include three types of magnetic metal powder particle 10 having different grain size distribution values (Trimodal). However, since this is only an example, the body 100 may include two types of magnetic metal powder particle 10 having different grain size distribution values (Bimodal). The body 100 may include two or more types of magnetic metal powder particle 10 having different grain size distribution values to improve density of a magnetic material (the magnetic metal powder particle 10), based on the body 100 having the same volume (improvement of a filling rate).

The resin (R) may include epoxy, polyimide, liquid crystal polymer, or the like, in a single form or combined forms, but is not limited thereto.

As an example, the body 100 may be formed by laminating at least one magnetic composite sheet having a structure, in which the magnetic metal powder particles 10 are dispersed in a resin R, on a winding coil 200 to be described later and curing the laminated magnetic composite sheet. As another example, the body 100 may be formed by disposing a winding coil 200 in a mold, filling the mold with a magnetic composite material including magnetic metal powder particles 10 and an insulating resin R, and curing the magnetic composite material. In the above-described examples, a core 110 of the body 100 may be formed by filling voids of a coil winding portion 210 of the winding coil 200 to be described later with a magnetic composite sheet or a magnetic composite material. As another example, the body 100 may be formed by disposing a winding coil 200 on a lower mold after additionally manufacturing the lower mold in advance to be disposed below the winding coil, disposing the magnetic composite sheet or the magnetic composite material mentioned above, and curing the magnetic composite sheet or the magnetic composite material. As another example, the body 100 may be formed by disposing a winding coil 200 between an upper mold and an upper mold after additionally manufacturing the lower mold and the upper mold in advance to be respectively disposed below and above the winding coil 200, and coupling the lower and upper molds to each other. In the above-described examples, at least one boundary corresponding to the lower mold may be formed in the body 100. The lower mold may be a T-shaped mold including a core penetrating through a central portion of the winding coil 200, but is not limited thereto. At least one of the lower mold and the upper mold may include magnetic metal powder particles 10 and a resin R.

The magnetic metal powder particles 10 may be exposed to the first to sixth surfaces 101, 102, 103, 104, 105, 106 of the body 101. When the body 100 is formed, a large-area magnetic composite sheet may be used to collectively form a plurality of bodies 100. In this case, after curing the magnetic composite sheet, a large-area body may be diced to have a size corresponding to a size of a body of an individual component. In this case, at least some of the magnetic metal powder particles 10, included in the large-area body, may be may be cut by a dicing tip. The cut magnetic metal powder particles 10 may be disposed in a form exposed to the first to fourth surfaces 101, 102, 103 and 104 of the body 100 of the individual component. The cut magnetic metal powder 10 may provide conductivity to a surface of the body 100 in a plating process for forming external electrodes 400 and 500 to be described later on the surface of the body 100.

The winding coil 200 may be embedded in the body 100 to express characteristics of a coil component. For example, when the coil component 1000 according to this embodiment is used as a power inductor, the winding coil 200 may store an electric field as a magnetic field to maintain an output voltage, serving to stabilize power of an electronic device.

The winding coil 200 may include a coil winding portion 210, an air-cored coil winding portion, and lead-out portions 221 and 222, respectively extending from both ends of the coil winding portion 210 to be exposed to the first and second surfaces of the body 100.

The coil winding portion 210 may be formed by spirally winding a metal wire MW such as a copper wire having a surface coated with an insulating covering portion CI. As a result, each turn of the coil winding portion 210 may have a form covered with the insulating coating portion CI. The coil winding portion 210 may include at least one layer. Each layer of the coil winding portion 210 may be in a planar spiral form to have at least one turn. On the other hand, the metal wire MW forming the winding coil 200 may be a flat type or an edge-wise type.

The lead-out portions 221 and 222 may extend from the coil winding portion 210 to be exposed to the first and second surfaces 101 and 102 of the body 100, respectively. The lead-out portions 221 and 222 may be integrally formed with the winding portion 210. The winding portion 210 and the lead-out portions 221 and 222 may be integrally formed using the metal wire MW coated with the insulating coating portion CI. The lead-out portions 221 and 222 may be both end portions of the metal wire MW coated with the insulating coating portion CI.

The first insulating layer 610 may surround the entire first to sixth surfaces 101, 102, 103, 104, 105, 106 of the body 100, and may be provided with an opening in which electrodes 400 and 500 to be described later are formed. For example, the first insulating layer 610 is formed to surround the entire surface of the body 100 together with the external electrodes 400 and 500. The first insulating layer 610, disposed on each of the first and second surfaces 101 and 102 of the body 100, may have one region and the other region spaced apart from each other in a width (W) direction by a slit in which connection portions 411*b* and 511 of the eternal electrodes 400 and 500 to be described later are formed. This will be described later.

The first insulating layer 610 may function as a plating resist when the external electrodes 400 and 500 are formed by plating, but the present disclosure is not limited thereto.

The first insulating layer 610 may include a thermoplastic resin such as a polystyrene-based resin, a vinyl acetate-based resin, a polyester-based resin, a polyethylene-based resin, a polypropylene-based resin, a polyamide-based resin, a rubber-based resin, or an acrylic-based resin, a thermosetting resin such as a phenol-based resin, an epoxy-based resin, a urethane-based resin, a melamine-based resin, or an alkyd-based resin, a photosensitive resin, parylene, $SiO_x$, or $SiN_x$.

The first insulating layer 610 may be formed by applying a liquid insulating resin to the surface of the body 100, applying an insulating paste to the surface of the body 100, laminating insulating film on the surface of the body 100, or forming an insulating resin on the surface of the body 100 using vapor deposition. The insulating film may be a dry film DF including a photosensitive insulating resin, an Ajinomoto Build-up Film (ABF) not including a photosensitive insulating resin, or a polyimide film.

The first insulating layer 610 may be formed on the first to sixth surfaces 101, 102, 103, 104, 105 and 106 of the body 100 to form boundaries therewith. Alternatively, the first insulating layer 610 may be integrally formed on the first to sixth surfaces 101, 102, 103, 104, 105, and 106 of the body 100.

The first insulating layer 610 may be formed to have a thickness ranging from 10 nm to 100 μm. When the thickness of the first insulating layer 610 is less than 10 nm, characteristics of a coil component such as a Q factor, a breakdown voltage, and a self-resonant frequency (SRF) may be decreased. When the thickness of the first insulating layer 610 is greater than 100 μm, overall length, width, and thickness of the coil component may be increased to result in a disadvantage for thinning.

The term "thickness of the first insulating layer 610" may refer to a distance to one point, in which a normal is in contact with a segment corresponding to one surface of the first insulating layer 610 opposing the other surface of the first insulating layer 610, when the normal extends from another point of a segment corresponding to the other surface of the first insulating layer 610 in contact with the body 100, based on an optical microscope image, an SEM image, or the like, for a cross section in a width-thickness direction (a W-T cross section) in a central portion of the body 100 in a length (L) direction. Alternatively, the term "thickness of the first insulating layer 610" may refer to an arithmetic mean of distances to a plurality of points, in which a normal is in contact with a segment corresponding to one surface of the first insulating layer opposing the other surface of the first insulating layer 610, when the normal extends in a width (W) direction from each of a plurality of points of a segment corresponding to the other surface of the first insulating layer 610 in contact with the body 100, based on the cross-sectional image.

The external electrodes 400 and 500 may be disposed on the first and second surfaces 101 and 102 of the body 100 to be connected to the winding coil 200, and may be disposed to be spaced apart from each other on the sixth surface 106 of the body 100.

The external electrodes 400 and 500 include a first external electrode 400, connected to and in contact with the first lead-out part 221, and a second external electrode 500 connected to and in contact with the second lead-out part 222. The first external electrode 400 includes a first connection portion 411, disposed on the first surface 101 of the body 100 to be connected to and in contact with the first lead-out portion 221, and a first extension portion 412 extending from the first connection portion 411 to the sixth surface 106 of the body 100. The second external electrode 500 includes a second connection portion 511, disposed on the second surface 102 of the body 100 to be connected to the second lead-out portion 222, and a second extension portion 512 extending from the second connection portion 511 to the sixth surface 106 of the body 100. The first extension portion 412 of the first external electrode 400 and the second extension portion 512 of the second external electrode 500 are disposed to be spaced apart from each other on the sixth surface 106 of the body 100 by the first insulating layer 610, formed in a central portion of the sixth surface 106 of the body 100, such that they are not in contact with each other.

The external electrodes 400 and 500 may be formed on the surface of the body 100 by performing electroplating using the first insulating layer 610 formed on the surface of the body 100 as a plating resist. When the body 100 includes magnetic metal powder particles 10, the magnetic metal powder particles 10 may be exposed to the surface of the body 100. Due to the magnetic metal powder particles 10 exposed to the surface of the body 100, conductivity may be provided to the surface of the body 100 during electroplating and the external electrodes 400 and 500 may be formed on the surface of the body 100 using the electroplating.

The connection portions 411 and 511 and the extension portions 412 and 512 of the external electrodes 400 and 500 may be formed by the same plating process, and thus, a boundary may not be formed therebetween. For example, the first connection portion 411 and the first extension portion 412 may be integrally formed, and the second connection portion 511 and the second extension portion 512 may be integrally formed. In addition, the connection portions 411 and 511 and the extension portions 412 and 512 may be formed of the same metal. However, this description does not exclude a case, in which the connection portions 411 and 511 and the extension portions 412 and 512 are formed by different plating processes to form a boundary therebetween, from the scope of the present disclosure.

The external electrodes 400 and 500 may be formed of a conductive material such as copper (Cu), aluminum (Al), silver (Ag), tin (Sn), gold (Au), nickel (Ni), lead (Pb), titanium (Ti), alloys thereof, but the present disclosure is not limited thereto. The external electrodes 400 and 500 may be formed by applying and curing a conductive paste including conductive powder particles. Alternatively, the external electrodes 400 and 500 may be formed using a plating method or a vapor deposition method.

Each of the external electrodes 400 and 500 may be formed to have a thickness ranging from 0.5 μm to 100 μm. When the thickness of each of the external electrodes 400 and 500 is less than 0.5 μm, desorption and peeling may occur during substrate mounting. When the thickness of each of the external electrodes 400 and 500 is greater than 100 μm, it may be disadvantageous for thinning of a coil component.

In FIG. 3, each of the external electrodes 400 and 500 is illustrated as including a single layer. However, the scope of this embodiment is not limited thereto, and each of the external electrodes 400 and 500 may include a plurality of layers. For example, the first external electrode 400 may be formed by performing electroplating two or more times to include two or more plating layers.

The second insulating layer 620 may be disposed on the first and second surfaces 101 and 102 of the body 100 to cover the first insulating layer 610, disposed on each of the first and second surfaces 101 and 102, and the connection portions 411 and 511 of the first and second external electrodes 400 and 500. The second insulating layer 620 may cover the connection portions 411 and 511 of the first and second external electrodes 400 and 500 to prevent the coil component 1000 from being short-circuited with another electronic component mounted adjacent thereto when the coil component 1000 is mounted on a mounting substrate such as a printed circuit board, or the like.

The second insulating layer 620 may include a thermoplastic resin such as a polystyrene-based resin, a vinyl acetate-based resin, a polyester-based resin, a polyethylene-based resin, a polypropylene-based resin, a polyamide-based resin, a rubber-based resin, or an acrylic-based resin, a thermosetting resin such as a phenol-based resin, an epoxy-based resin, a urethane-based resin, a melamine-based resin, or an alkyd-based resin, a photosensitive resin, parylene, $SiO_x$, or $SiN_x$.

The second insulating layer 610 may be formed by applying a liquid insulating resin to the surface of the body 100, applying an insulating paste to the surface of the body 100, laminating insulating film on the surface of the body 100, or forming an insulating resin on the surface of the body 100 using vapor deposition. The insulating film may be a dry film DF including a photosensitive insulating resin, an Ajinomoto Build-up Film (ABF) not including a photosensitive insulating resin, or a polyimide film.

The second insulating layer 620 may be formed to have a thickness ranging from 10 nm to 100 μm. When the thickness of the second insulating layer 620 is less than 10 nm, characteristics of a coil component such as a Q factor, a breakdown voltage, and a self-resonant frequency (SRF) may be decreased. When the thickness of the second insulating layer 620 is greater than 100 μm, overall thickness of the coil component may be increased to result in disadvantage for thinning.

The term "thickness of the second insulating layer 620" may refer to a distance to one point, in which a normal is in contact with a segment corresponding to one surface of the second insulating layer 620 opposing the other surface of the insulating layer 620, when the normal extends in a length (L) direction from another point of a segment corresponding to the other surface of the second insulating layer 620 in contact with the body 100, based on an optical microscope image, an SEM image, or the like, for a cross section in a length-thickness direction (an L-T cross section) in a central portion of the body 100 in a width (W) direction. Alternatively, the term "thickness of the second insulating layer 620" may refer to an arithmetic mean of distances to a plurality of points, in which a plurality of normals is in contact with one surface of the second insulating layer 620 opposing the other surface of the second insulating layer 620, when the normal extends in a length (L) direction from each of a plurality of points of a segment corresponding to the other surface of the second insulating layer 620 in contact with the body 100, based on the cross-sectional image.

Hereinafter, a disposition relationship between the first external electrode 400 and the first insulating layer 610 and will be described, based on the first surface 101 of the body 100. This description may be equivalently applied to the second external electrode 500 and the first insulating layer 610 disposed on the second surface 102 of the body 100.

Referring to FIG. 3, the first insulating layer 610 may be disposed on the first surface 101 of the body 100, and may have one region 610A and another region 610B spaced apart from each other in a width (W) direction, perpendicular to a thickness (T) direction. As an example, the regions 610A and 610B of the first insulating layer 610 may be spaced apart from each other by forming the region 610A of the first insulating layer 610 in one portion of the first surface 101 of the body 100 and forming the region 610B of the first insulating layer 610 in another portion of the first surface 101 spaced apart from the one portion of the first surface 101. Alternatively, the regions 610A and 610B of the first insulating layer 610 may be spaced apart from each other by forming the first insulating layer 610 on the entire first surface 101 of the body 100 and forming a slit, extending in the thickness (T) direction, in the first insulating layer 610 to expose a portion of the first surface 101 of the body 100. The slit may be formed in the first insulating layer 610 by a physical and/or chemical processing method to expose the first lead-out portion 221. In the case of the former, a selective formation method, the regions 610A and 610B of the first insulating layer 610 may not have a shape in which side surfaces opposing each other are each perpendicular to the first surface 101 of the body 100. In the case of the later, a selective removal method, the regions 610A and 610B of the first insulating layer 610 may have a shape in which side surfaces opposing each other are each perpendicular to the first surface 101 of the body 100. As an example, the phrase "the first surface 101 of the body 100 and the side surface of the one region 610A of the first insulating layer 610 are perpendicular to the first surface 101 of the body 100" may mean that the first surface 101 of the body 100 and the side surface of the one region 610A of the first insulating layer 610 form an angle ranging from 60 degrees to 90 degrees.

The first connection portion 411 of the first external electrode 400 may be disposed between the regions 610A and 610B of the first insulating layer 610, and may be connected to and in contact with the first lead-out portion 221.

A ratio of W3 to the sum of W1, W2, and W3 (W3/(W1+W2+W3)) is 0.5 or more to 0.917 or less, where W1 is a length of the region 610A of the first insulating layer 610 in the width (W) direction, W2 is a length of the region 610B of the first insulating layer 610 in the width (W) direction, and W3 is the length of the first connection portion 411 in the width (W) direction. When the ratio is less than 0.5, the length W3 of the first connection portion 411 in the width direction W is significantly small, and thus, connectivity between the first lead-out part 221 and the first external electrode 400 may be deteriorated. When the ratio is greater than 0.917, the first external electrode 400 may be formed to an edge of the first surface 101 of the body 100, on which the first insulating layer 610 is formed, due to plating bleeding.

The term "length W1 of the region 610A of the first insulating layer 610 in the width (W) direction" may refer to a distance to a point, in which a normal is in contact with a segment corresponding to one surface of the region 610 of the first insulating layer 610 opposing the other surface of the region 610A of the insulating layer 610, when the normal extends in the width (W) direction from the segment corresponding to the other surface of the region 610A of the first insulating layer 610 in contact with the first connection portion 411 of the first external electrode 400, based on an optical microscope image captured in a direction B of FIG. 1 after the second insulating layer 620 is removed by polishing, or the like. Alternatively, the term "length W1 of the region 610A of the first insulating layer 610 in the width (W) direction" may refer to an arithmetic mean of distances to a plurality of points, in which a plurality of normals are in contact with a segment corresponding to one surface of the region 610A of the first insulating layer 610 opposing the other surface of the region 610A of the first insulating layer, when the normal extends in the width (W) direction from each of a plurality of points of a segment corresponding to the other surface of the region 610A of the first insulating layer 610 in contact with the first connection portion 411 of the first external electrode 400, based on the image. The above description may be equivalently applied to the length W2 of the region 610B of the first insulating layer 610 in the width (W) direction and the length W3 of the connection portion 411 in the width (W) direction.

The lengths W1 and W2 of the regions 610A and 610B of the first insulating layer 610 in the width (W) direction may be the same. In this case, since the first connection portion 411 may be disposed in a central portion of the first surface 101 of the body 100 in the width (W) direction, connectivity between the first lead-out portion 221 and the first external electrode 400 may be improved.

The length W1 of the region 610A of the first insulating layer 610 in the width (W) direction may be 50 μm or more to 300 μm or less. When a length W1 of the region 610A of the first insulating layer 610 in the width (W) direction is less than 50 μm, the first external electrode 400 may be formed to an edge of the first surface 101 of the body 100, in which the first insulating layer 610 is formed, due to plating bleeding. When the length W1 of the region 610A of the first insulating layer 610 in the width (W) direction is greater than 300 μm, the connectivity between the first lead-out portion 221 and the first external electrode 400 may be deteriorated.

The length W3 of the first connection portion 411 in the width (W) direction may be 600 μm or more to 1100 μm or less. When length W3 of the first connection portion 411 in the width (W) direction is less than 600 μm, the connectivity between the first lead-out portion 221 and the first external electrode 400 may be deteriorated. When the length W3 of the first connection portion 411 in the width (W) direction is greater than 1100 μm, the first external electrode 400 may be formed to the edge of the first surface 101 of the body 100, in which the first insulating layer 610 is formed, due to plating bleeding.

Table 1 illustrates plating bleeding defect rates and poor connectivity rates obtained by performing experiments while changing lengths W1 and W3 of the region 610A of the first insulating layer 610 and the first connection portion 411 in the width (W) direction, on the first surface 101 of the body 100. In Experiments 1 to 9, lengths W1 and W2 of the regions 610A and 610B of the first insulating layer 610 in the width (W) direction were the same. In Experiments 1 to 9, other than the above conditions, the other conditions were the same. The plating bleeding defect rate was expressed as percentage of the number of first connection portions extending to an edge between a first surface and a third surface of a body after 20 samples were prepared for each of Experiments 1 to 9 and the first connection portion was plated and formed on each of the samples. The poor connectivity rate was expressed as percentage of resistances between a first connection portion and a first lead-out portion, greater than a reference value, after 20 samples were prepared for each of Experiments 1 to 9 and the first connection portion was plated and formed on each of the samples.

TABLE 1

| Experiment | W1 (μm) | W3 (μm) | W1/(W1 + W2 + W3) | Plating Bleeding Defect Rate (%) | Poor Connectivity Rate (%) |
|---|---|---|---|---|---|
| 1 | 20 | 1160 | 0.967 | 75 | 0 |
| 2 | 35 | 1130 | 0.942 | 52 | 0 |
| 3 | 50 | 1100 | 0.917 | 1.5 | 0 |
| 4 | 100 | 1000 | 0.833 | 1.4 | 0 |
| 5 | 200 | 800 | 0.667 | 1.4 | 0 |
| 6 | 300 | 600 | 0.500 | 1.5 | 0 |
| 7 | 350 | 500 | 0.417 | 1.5 | 9 |
| 8 | 400 | 400 | 0.333 | 1.2 | 26 |
| 9 | 500 | 200 | 0.167 | 1.4 | 76 |

Referring to Table 1, when W1/(W1+W2+W3) is 0.5 or more to 0.917 or less, connectivity between the winding coil 200 and the first external electrode 400 may be secured while reducing plating bleeding.

For example, in the case of Experiments 7, 8, and 9 in which W1/(W1+W2+W3) was less than 0.5, a plating bleeding defect rate was decreased but connectivity between the winding coil 300 and the first external electrode 400 was deteriorated. In Experiments 1 and 2 in which W1/(W1+W2+W3) was greater than 0.917, connectivity was not problematic but a plating bleeding defect rate was increased.

Figure 6:
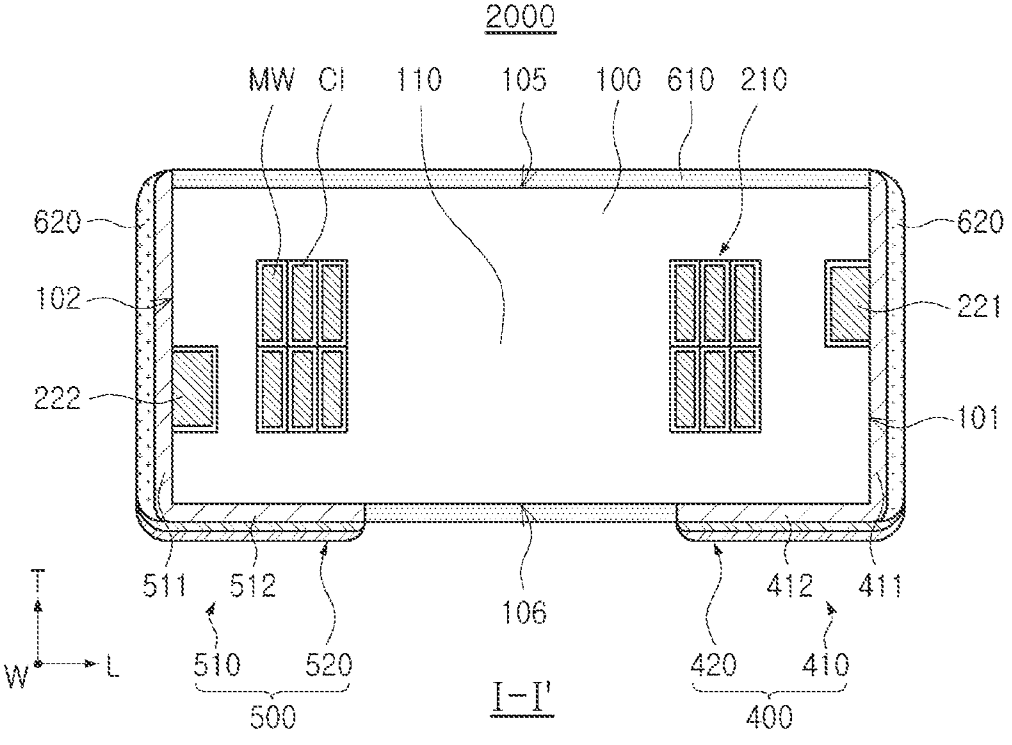
FIG. 6 is a schematic view of a coil component according to another exemplary embodiment of the present disclosure, and is a view corresponding to a cross-sectional view taken along line I-I' of FIG. 1.

FIG. 6 is a schematic view of a coil component according to another exemplary embodiment of the present disclosure, and is a view corresponding to a cross-sectional view taken along line I-I' of FIG. 1.

When FIG. 6 is compared with FIGS. 1 to 5, a difference of a coil component 2000 according to this embodiment from the coil component 1000 according to an exemplary embodiment is external electrodes 400 and 500. Therefore, a description of the coil component 2000 will be given while focusing on only the external electrodes 400 and 500.

The external electrodes 400 and 500 may further include plating layers 420 and 520 disposed on extension portions 412 and 512. Specifically, the first external electrode 400 may include a first metal layer 410, including a first connection portion 411 and a first extension portion 412, and a first plating layer 420 disposed on the first extension portion 412. The second external electrode 500 may include a second metal layer 510, including a second connection portion 511 and a second extension portion 512, and a second plating layer 520 disposed on the second extension part 512. The plating layers 420 and 520 may include a plurality of layers. For example, as illustrated in FIG. 6, each of the plating layers 420 and 520 may include a plurality of layers. In this case, each of the plating layers 420 and 520 may have a double-layer structure including a nickel (Ni) plating layer, disposed on the extension portions 412 and 512, and a tin (Sn) plating layer disposed on the nickel (Ni) plating layer, but the present disclosure is limited thereto.

As described above, a plating bleeding defect of an external electrode may be reduced while maintaining connectivity between a winding coil and the external electrode.

While exemplary embodiments have been shown and described above, it will be apparent to those skilled in the art that modifications and variations could be made without departing from the scope of the present disclosure as defined by the appended claims.

What is claimed is:

1. A coil component comprising:

a body having a first surface and a second surface, opposing each other in a first direction, and a first end surface connecting the first surface and the second surface;

a winding coil disposed in the body and having a lead-out portion exposed to the first end surface of the body;

a first insulating layer disposed on the first end surface of the body and having a first region and a second region spaced apart from each other in a second direction, perpendicular to the first direction;

an external electrode having an extension portion extending from a connection portion to the first surface of the body; and a second insulating layer covering the first insulating layer and the connection portion on the first end surface of the body, wherein the second insulating layer contacts the connection portion of the external electrode between the first and second regions of the first insulating layer, wherein a ratio of a length of the connection portion in the second direction to a sum of lengths of the first region and the second region of the first insulating layer and the connection portion in the second direction is 0.5 or more to 0.917 or less.

2. The coil component of claim 1, wherein a length of each of the first region and the second region of the first insulating layer in the second direction is in a range from 50 μm to 300 μm.

3. The coil component of claim 1, wherein a length of the connection portion in the second direction is in a range from 600 μm to 1100 μm.

4. The coil component of claim 1, wherein the lengths of the first region and the second region of the first insulating layer in the second direction are the same.

5. The coil component of claim 1, wherein the body includes magnetic metal powder particles and a resin, and the magnetic metal powder particles are exposed to the first end surface of the body.

6. The coil component of claim 5, wherein the magnetic metal powder particle, exposed to the first end surface of the body, has a cut surface.

7. The coil component of claim 1, wherein the connection portion and the extension portion are integrally formed.

8. The coil component of claim 1, wherein the external electrode further includes a plating layer disposed on the extension portion.

9. The coil component of claim 1, wherein the body further has a second end surface connecting the first surface and the second surface and opposing the first end surface, the winding coil includes a first lead-out portion, exposed to the first end surface of the body, and a second lead-out portion exposed to the second end surface of the body, and the first insulating layer has a first region on the first end surface of the body and the second region on the second end surface of the body.

10. The coil component of claim 9, wherein the external electrode includes a first external electrode, connected to the first lead-out portion, and a second external electrode connected to the second lead-out portion.

11. The coil component of claim 10, wherein the first insulating layer covers all regions of a surface of the body, other than a region in which the first and second external electrodes are disposed.

12. The coil component of claim 1, wherein the external electrode further includes a connection portion extending along an entirety of the first end surface in a third direction perpendicular to the first and second directions and disposed between the first region and the second region of the first insulating layer to be connected to the lead-out portion.

13. A coil component comprising:

a body;

a winding coil disposed in the body and including a first lead-out portion and a second lead-out portion exposed to a pair of end surfaces of the body opposing each other;

a first insulating layer disposed on each of the pair of end surfaces and provided with a slit formed in a thickness direction of the body to expose the first and second lead-out portions; and a pair of external electrodes, each including a connection portion disposed in the slit and connected to a corresponding lead-out portion;

a second insulating layer contacting the connection portion of the pair of external electrodes between regions of the first insulating layer on either side of the slit, wherein a ratio of a length of the connection portions in a width direction of the body to a length of the first insulating layer, having the slit, in the width direction of the body is in a range from 0.5 to 0.917.

14. The coil component of claim 13, further comprising a second insulating layer disposed over the first insulating layer and the connection portion on the pair of end surfaces of the body.

15. The coil component of claim 13, wherein each of the pair of external electrode further includes an extension portion extending from the corresponding connection portion to a surface of the body connecting the pair of end surfaces.

* * * * *